(12) United States Patent
Janssen et al.

(10) Patent No.: US 8,678,039 B2
(45) Date of Patent: Mar. 25, 2014

(54) DOUBLE LAYER CONDUIT

(75) Inventors: Franciscus Antonius Henri Janssen, Amsterdam (NL); Raghunath Gopal Menon, Katy, TX (US); Juan Pablo Pontaza, Katy, TX (US); Aloysius Johannes Nicolaas Vreenegoor, Amsterdam (NL); Johannes Bernardus Wilhelmus Van Zummeren, Amsterdam (NL)

(73) Assignee: Shell Oil Company, Houston, TX (US)

( * ) Notice: Subject to any disclaimer, the term of this patent is extended or adjusted under 35 U.S.C. 154(b) by 256 days.

(21) Appl. No.: 13/146,996

(22) PCT Filed: Jan. 28, 2010

(86) PCT No.: PCT/EP2010/050961
§ 371 (c)(1),
(2), (4) Date: Sep. 16, 2011

(87) PCT Pub. No.: WO2010/086344
PCT Pub. Date: Aug. 5, 2010

(65) Prior Publication Data
US 2012/0192984 A1    Aug. 2, 2012

(30) Foreign Application Priority Data
Jan. 30, 2009 (EP) .................................... 09151693

(51) Int. Cl.
*F16L 9/18* (2006.01)

(52) U.S. Cl.
USPC ......................................................... 138/114

(58) Field of Classification Search
USPC ................................................ 138/97–98, 114
See application file for complete search history.

(56) References Cited

U.S. PATENT DOCUMENTS

| 3,780,751 A | 12/1973 | Styring, Jr. ...................... 137/13 |
| 3,950,461 A * | 4/1976 | Levens .......................... 264/46.5 |
| 4,915,121 A * | 4/1990 | Rains .......................... 137/15.04 |
| 6,122,791 A | 9/2000 | Baugh et al. ............. 15/104.061 |
| 6,939,082 B1 | 9/2005 | Baugh ............................. 405/154 |
| 7,267,739 B2 * | 9/2007 | Blackmore et al. ........... 156/293 |

FOREIGN PATENT DOCUMENTS

| DE | 19839173 | 3/2000 | ................ F17D 5/04 |
| DE | 10035809 | 1/2002 | ............ F16L 55/103 |
| EP | 465252 | 1/1992 | ................ F17C 1/16 |
| JP | 08312874 | 11/1996 | ............... F16L 55/24 |
| WO | WO9925495 | 5/1999 | ................ B08B 9/04 |
| WO | WO0077587 | 12/2000 | ............... G05D 7/00 |

* cited by examiner

*Primary Examiner* — Frederick C Nicolas

(57) ABSTRACT

An elongated conduit including a tubular outer pipe, an elastic inner pipe and an annulus between the outer pipe and inner pipe, the conduit being provided with a fluid supply device, the outer pipe being provided with an inlet for introducing the fluid in the annulus between the outer pipe and the inner pipe, which inlet communicates with the fluid supply device.

13 Claims, 2 Drawing Sheets

DOUBLE LAYER CONDUIT

CROSS REFERENCE TO EARLIER APPLICATIONS

The present application is a national stage application of International application No. PCT/EP2010/050961, filed 28 Jan. 2010, which claims priority from EP09151693.0, filed on 30 Jan. 2009, which is incorporated herein by reference.

FIELD OF THE INVENTION

The present invention concerns an elongated conduit comprising a tubular outer pipe, an elastic inner pipe and an annulus between the outer pipe and the inner pipe, the conduit being provided with a fluid supply device for introducing the fluid in the annulus between the outer pipe and the inner pipe. The invention further concerns a method to remove blockages in such an elongated conduit, and a method for transporting a liquid, semi-liquid, paste-like or solid material through the inner pipe of such an elongated conduit.

BACKGROUND OF THE INVENTION

Pipelines are widely used for the transport of oil, gas, water etc. Pipelines may be used onshore as well as offshore. Usually these pipelines are single layer pipes made from metal, e.g. steel, copper, lead etc. For the transport of oil and gas usually steel pipelines are used. In the case of flexible pipelines, often a multilayered pipeline is used, comprising a flexible polymer pipe surrounded by several layers of helically wound metal structures.

Blockages in pipelines, especially in subsea pipelines and pipelines in cold climate area's, may cause substantial damage in the form of production downtime. The blockages are typically caused by wax and/or hydrate formation, possibly resulting in gel formation in the oil. This happens especially when the flow in the pipeline is interrupted, followed by cooling of the oil. Quite often it is difficult or even impossible to remove these blockages by conventional methods, particularly when the blockage is located at a substantial distance from an accessible end of the pipeline. Increasing the pressure would often require pressures above the pipeline specification, which is clearly undesired.

In U.S. Pat. No. 3,780,751, a method is described for restoring the flow in a blocked pipeline by injection fluid at several points in the pipeline.

In U.S. Pat. No. 6,122,791, a retrievable pig is described for the cleaning of pipelines and the removal of blockages.

In WO 99/25495, a pipe cleaning pig provided with a tow cable.

In U.S. Pat. No. 6,939,082, a vehicle is described that moves along a subsea pipeline, the vehicle providing hot seawater for circulating over the outer surface of the pipeline in order to melt hydrates and/or paraffin deposits.

SUMMARY OF THE INVENTION

A primary object of the invention is to provide a pipeline with specific provisions to make it possible to simply remove blockages. The assembly comprises an outer tubular wall provided with an elastic inner pipe, suitably a snug fit elastic inner pipe. By pulsing a fluid in the annulus between the outer and inner pipe some movement is created of the blockading structure, which results in deblocking the pipeline. A further object is a method to remove blockages in pipelines by using the above described pipeline. The pipeline as described above makes it possible to remove blockages in pipelines, even when the blockage is located far away from one of the two ends of the pipeline. Yet another object is to provide a method for transporting a liquid, semi-liquid, paste-like or solid material through the above described pipeline.

Thus, the present invention concerns an elongated conduit comprising a tubular outer pipe, an elastic inner pipe and an annulus between the outer pipe and inner pipe, the conduit being provided with a fluid supply device, the outer pipe being provided with inlet means for introducing the fluid in the annulus between the outer pipe and the inner pipe, which inlet means communicates with the fluid supply device.

Using the conduit of the present invention it is possible to remove blockages, especially jelly like blockages, in pipelines. The method can be applied fairly quickly, much faster than cleaning pigs or subsea vehicles.

DETAILED DESCRIPTION OF THE PREFERRED EMBODIMENTS

Figure 1A:
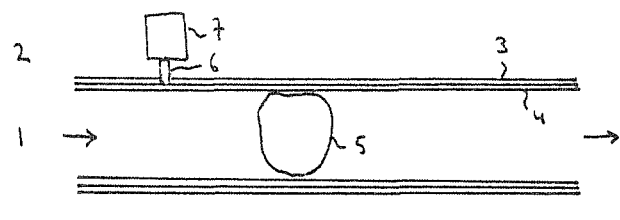
FIGS. 1A-D are sequential schematic illustrations showing operation of an apparatus in accordance with the present invention.
Figure 1B:
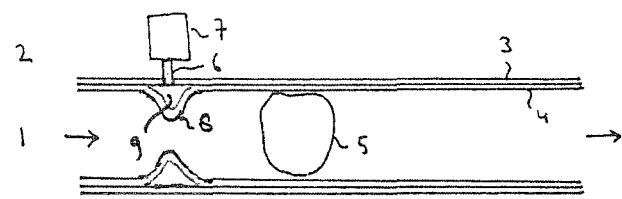
Figure 1C:
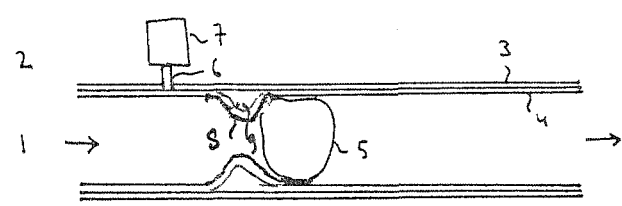
Figure 1D:
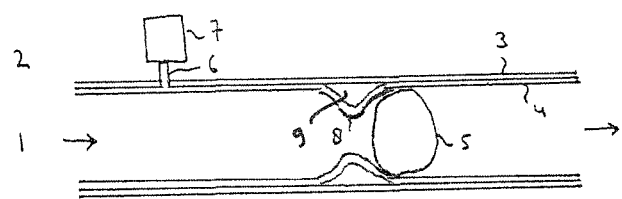

In FIGS. 1A-1D a method for removing a blockage in the inner of an elongated conduit in accordance with the present invention is schematically shown. A fluid (1) comprising a gas and a liquid is transported through an elongated conduit (2). The elongated conduit (2) comprises an outer pipe (3) and an inner pipe (4) which is snug fit to the outer pipe (4). In the inner pipe (4) a blockage (5) interrupts the transport of the fluid (1). The elongated conduit (2) is provided with an inlet means (6) which communicates with a fluid supply device (7). Via inlet means (6) a fluid (9) is passed from the fluid supply device (7) into the annulus (not shown) between the outer pipe (3) and inner pipe (4). As a result the inner pipe (4) collapses circumferentially. As can be seen in FIGS. 1A-1D this collapsed part (8) of the inner pipe (4) and fluid (9) of the inner pipe (4) move due to flow of fluid (1) towards the blockage (5) until it has reached blockage (5), after which the blockage (5) is removed from the inner pipe (4) in the direction of the flow of fluid (1).

Figure 2:
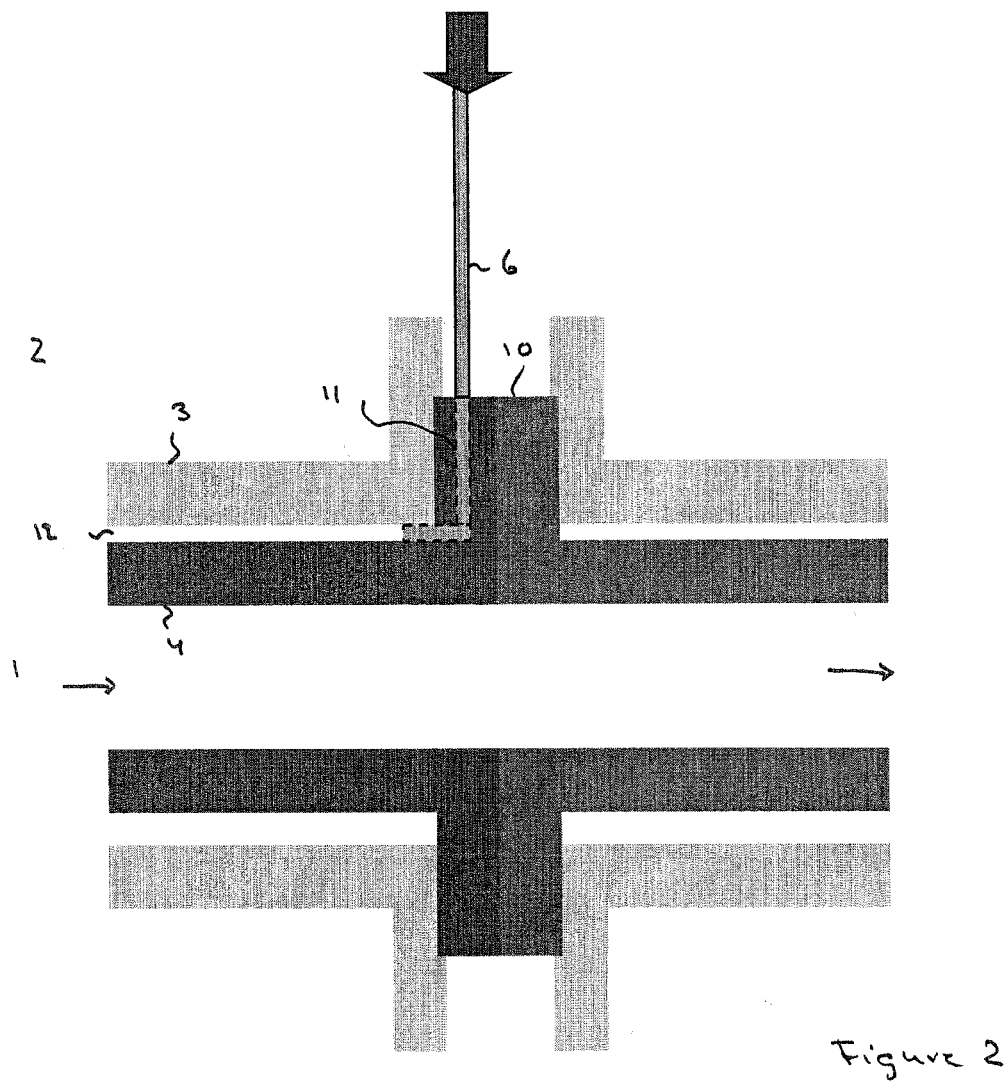
FIG. 2 is a schematic cross-section of an apparatus constructed in accordance with an alternative embodiment.

In another embodiment of the present invention, as shown in FIG. 2, the upwardly directed part of the outer pipe (3) and the upwardly directed part of the inner pipe (4) form a flange (10). The inlet means (6) communicates with a passage (11) that is drilled through the upwardly directed part of the inner pipe (4), whereby the passage (11) debouches in annulus (12) which is located between the outer pipe (3) and inner pipe (4). In this way, a fluid can be introduced in the annulus (12) in accordance with the present invention.

Double layered pipelines as such are already known in the art. However, these double layered pipelines are quite different from the one described above.

Double layered pipelines are occasionally used in the industry, e.g. in the case of transport of hazardous chemicals. For instance, in U.S. Pat. No. 4,915,121 a coaxial piping system is described comprising an outer conduit, an inner conduit, a space between the two conduits and a spacer system. In the case of leakage of the inner tube, the leaked chemicals will be trapped by the outer conduit. The leaked chemicals may be removed by means of a purge gas.

In WO 00/77587, a host tubular is described comprising a liner system and a fluid-circulation annulus between the two. Any undesired fluids in the annulus may be removed by circulating a removal fluid through the annulus.

In EP 465252, a conduit for compressed gas and/or cryogenic gas is described comprising a gas impermeable synthetic polymer surrounded by a structural component to provide structural integrity.

In the present invention a relatively inflexible outer pipeline is used. The fast introduction of the fluid results in a pulse flowing through the annulus between the outer and the inner pipe. The movement of the fluidum between the two pipes may be described as a wave motion. As such it is also possible to deliver a number of pulses quickly after each other in order to remove the blockage.

Preferably, the elongated conduit according to the present invention is provided with a plurality of inlet means for introducing the fluid in the annulus between the inner pipe and the outer pipe, in which the inlet means communicate with one or more common fluid supply devices or each inlet means communicates with an individual fluid supply device.

Suitably, each inlet means communicates with an individual fluid supply device.

When a plurality of inlet means is used the inlet means are suitably regularly space from each other in the length-wise direction of the elongated conduit.

Suitably, the fluid supply device or fluid supply devices are provided with a mechanism to pulse the fluid in the annulus between the outer pipe and the inner pipe.

In the annulus between the outer pipe and the inner pipe fluid can already be present, e.g. in the form of a fluid reservoir.

In accordance with the present invention suitably a relatively inflexible outer pipeline can be used. Preferably, the outer pipe is a metal pipe, especially a steel pipe.

Preferably, the elastic inner pipe is made of an elastic organic polymer, preferably PE, PVC, PP, or PU.

Suitably, the inner diameter of the outer pipe is between 15 cm and 120 cm, preferably between 25 and 65 cm.

The elongated conduit according to the present invention can suitably have a length between 100 m and 200 km, especially between 1 and 20 km.

Suitably, the elongated conduit is at or near its starting point provided with a pneumatic device for pulsing a pressure in the annulus between the outer pipe and inner pipe in the length-wise direction of the elongated conduit.

In another embodiment of the present invention the elongated conduit is provided with a mechanism for decreasing the pressure in the inner pipe.

Preferably, the inner wall of the outer pipe of the elongated conduit according to the present invention is provided with a number of annual projections that are regularly spaced from each other in the length-wise direction of the inner wall of the outer pipe.

Preferably, the inner pipe of the present elongated conduit is profiled in the length-wise direction.

The outer pipe and the inner pipe can form together a flange. Such an embodiment is shown in FIG. 2. In that case the inlet means for introducing the fluid in the annulus can be part of the upwardly directed part of the inner pipe which together with the upwardly directed part of the outer pipe forms the flange. Alternatively, the inlet means communicates with a passage that has been established in the upwardly directed part of the inner pipe, which passage debouches in the annulus. In another embodiment, the inlet means can be part of the upwardly directed part of the outer pipe which together with the upwardly directed part of the inner pipe forms the flange. Alternatively, the inlet means communicates with a passage which has been established in the upwardly directed part of the outer part, which passage debouches in the annulus. Preferably, the inlet means communicates with a passage that has been established in the upwardly directed part of the inner pipe, whereby the passage debouches in the annulus between the outer pipe and the inner pipe.

The present invention also provides a method to remove a blockage in the inner pipe of an elongated conduit according to the present invention, in which method a fluid is introduced in the annulus between the outer pipe and the inner pipe by means of the inlet means and the fluid is transported in the annulus between the outer and inner pipe in the length-wise direction of the elongated conduit.

The present invention further provides a method for transporting a liquid, semi-liquid, paste-like or solid material through the inner pipe of an elongated conduit according to the present invention, in which method a fluid is introduced in the annulus between the outer pipe and the inner pipe by means of the inlet means and the fluid is transported in the annulus between the outer and inner pipe in the length-wise direction of the elongated conduit, enabling the material which is present in the inner pipe to be transported through the inner pipe in the length-wise direction of the elongated conduit.

The fluid to be used in accordance with the present invention can suitably be selected from the group consisting of nitrogen, air, carbon dioxide, an oil, an alcohol, water or a hydraulic fluid.

Preferably, the fluid is introduced in the annulus between the outer pipe and the inner pipe at a pressure which is higher than the pressure applied within the inner pipe.

Preferably, the pressure at which the fluid is introduced in the annulus between the outer pipe and the inner pipe is between 1-6 bara higher than the pressure applied within the inner pipe.

The pressure applied within the inner pipe can suitably be in the range of 5-500 bara.

Preferably, the fluid is introduced in the annulus between the outer pipe and the inner pipe in pulsed manner.

The period of time between each pulse may vary considerably. Suitably, the period of time between each pulse is between 1-600 seconds, but also periods of time of more than 600 seconds or less than 1 second are possible.

Preferably, at or near the starting point of the conduit a pressure is pulsed in the annulus between the outer pipe and the inner pipe in the length-wise direction by means of a pneumatic device. In that case, the period of time between each pressure pulse can suitably be between 1-600 seconds.

Suitably, the difference in the pressure in the annulus between the outer pipe and the inner pipe and the pressure in the inner pipe is established by decreasing the pressure applied within the inner pipe.

As mentioned before in the annulus between the outer and inner pipe fluid can already be present, e.g. in the form of a fluid reservoir, before any of the present methods is being carried out.

The liquid, semi-liquid, paste-like or solid material which in accordance with the present invention can be transported through the present elongated conduit suitably comprises a biofuel, a multiphase gas/liquid mixture, a slurry, an emulsion or a deposited solid such as a hydrate, wax, asphaltene, scale, naphthenate or sand.

We claim:

1. An elongated conduit having a length of at least 100 m comprising a tubular outer pipe, an elastic inner pipe, an annulus between the outer pipe and inner pipe, a fluid supply device, and an inlet for introducing fluid from the fluid supply device into the annulus, wherein the inlet is in fluid communication with the fluid supply device and wherein an inner wall of the outer pipe is provided with a plurality of annual projections regularly spaced from each other in a length-wise direction of the inner wall of the outer pipe.

2. The elongated conduit of claim 1, wherein the elongated conduit comprises a plurality of inlets in fluid communication with the fluid supply device.

3. The elongated conduit of claim 1, wherein the elongated conduit comprises one or more additional inlets in fluid communication with one or more additional fluid supply devices.

4. The elongated conduit of claim 1, wherein the fluid supply device comprises a mechanism to pulse fluid introduced into the annulus.

5. The elongated conduit of claim 1, wherein the outer pipe is a metal pipe and the inner pipe comprises an elastic organic polymer.

6. The elongated conduit of claim 1, wherein of the outer pipe has an inner diameter of between 15 cm and 120 cm and wherein the conduit has a length between 100 m and 200 km.

7. The elongated conduit of claim 1, further comprising a pneumatic device for pulsing a pressure in the annulus.

8. A method to remove a blockage, comprising:
providing an elongated conduit having a length of at least 100 m, wherein the elongated conduit comprises: a tubular outer pipe, an elastic inner pipe, an annulus between the outer pipe and inner pipe, a fluid supply device, and an inlet for introducing fluid from the fluid supply device into the annulus, wherein the inlet is in fluid communication with the fluid supply device, and wherein the blockage is in the inner pipe and wherein an inner wall of the outer pipe is provided with a plurality of annual projections regularly spaced from each other in a length-wise direction of the inner wall of the outer pipe;
introducing the fluid into the annulus between the outer pipe and the inner pipe from the fluid supply device; and
transporting the fluid in the annulus between the outer and inner pipe in a length-wise direction of the elongated conduit.

9. The method of claim 8, wherein the blockage comprises a liquid, semi-liquid, past-like, or solid material and further comprising:
enabling the material to be transported through the inner pipe in the length-wise direction of the elongated conduit.

10. The method of claim 8, wherein which the fluid is introduced into the annulus between the outer pipe and the inner pipe at a pressure which is higher than the pressure applied within the inner pipe.

11. The method of claim 8, in which the fluid is introduced in the annulus between the outer pipe and the inner pipe in a pulsed manner.

12. The method of claim 8, in which at or near the starting point of the conduit a pressure is pulsed in the annulus between the outer pipe and the inner pipe in the length-wise direction by means of a pneumatic device.

13. The method of claim 9, in which the liquid, semi-liquid, paste-like or solid material comprises a biofuel, a multiphase gas/liquid mixture, a slurry, an emulsion, or a deposited solid.

* * * * *